(12) United States Patent
Ugai

(10) Patent No.: US 11,106,403 B2
(45) Date of Patent: Aug. 31, 2021

(54) IMAGE FORMING APPARATUS AND NON-TRANSITORY COMPUTER READABLE MEDIUM

(71) Applicant: FUJIFILM BUSINESS INNOVATION CORP., Tokyo (JP)

(72) Inventor: Yoshikazu Ugai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/670,020

(22) Filed: Oct. 31, 2019

(65) Prior Publication Data
US 2020/0081664 A1 Mar. 12, 2020

Related U.S. Application Data

(63) Continuation of application No. 15/667,946, filed on Aug. 3, 2017, now Pat. No. 10,496,340.

(30) Foreign Application Priority Data

Dec. 21, 2016 (JP) ................................. 2016-247355

(51) Int. Cl.
G06F 3/12 (2006.01)
H04N 1/00 (2006.01)
H04W 4/80 (2018.01)
H04W 88/02 (2009.01)
H04L 29/06 (2006.01)

(52) U.S. Cl.
CPC .......... G06F 3/1211 (2013.01); G06F 3/1221 (2013.01); G06F 3/1236 (2013.01); G06F 3/1292 (2013.01); H04N 1/00342 (2013.01); H04W 4/80 (2018.02); H04L 63/18 (2013.01); H04N 1/00307 (2013.01);
(Continued)

(58) Field of Classification Search
CPC .... G06F 3/1211; G06F 3/1221; G06F 3/1236; G06F 3/1292; H04W 4/80; H04W 88/02; H04N 1/00342; H04N 1/00307; H04N 2201/0094; H04N 2201/006; Y02D 10/00; H04L 63/18
See application file for complete search history.

(56) References Cited

U.S. PATENT DOCUMENTS 8,483,744 B2 7/2013 Takada et al.
9,063,689 B2 6/2015 Suzuki et al.
(Continued)

FOREIGN PATENT DOCUMENTS

JP 4894826 B2 3/2012
JP 2014-222865 A 11/2014
(Continued)

OTHER PUBLICATIONS

Feb. 25, 2019 Office Action issued in U.S. Appl. No. 15/667,946.
(Continued)

Primary Examiner — Neil R McLean
(74) Attorney, Agent, or Firm — Oliff PLC

(57) ABSTRACT

An image forming apparatus controls at least one proximity communication device in such a manner that an external apparatus is not capable of reading information from the at least one proximity communication device during a period in which power supply to the at least one proximity communication device is stopped.

5 Claims, 4 Drawing Sheets

(52) U.S. Cl.
CPC .............. *H04N 2201/006* (2013.01); *H04N 2201/0094* (2013.01); *H04W 88/02* (2013.01); *Y02D 10/00* (2018.01)

(56) References Cited

U.S. PATENT DOCUMENTS

| | | | |
|---|---|---|---|
| 9,335,957 | B2 | 5/2016 | Okamura |
| 9,781,298 | B2 | 10/2017 | Cabiles et al. |
| 9,888,681 | B2 | 2/2018 | Beau et al. |
| 2009/0108680 | A1* | 4/2009 | Minemura .............. H02J 9/005 307/104 |
| 2013/0063253 | A1* | 3/2013 | Rashid ............. G06K 19/07769 340/10.5 |
| 2014/0211239 | A1* | 7/2014 | Onishi ............... H04N 1/00885 358/1.14 |

FOREIGN PATENT DOCUMENTS

| | | |
|---|---|---|
| JP | 2016-57776 A | 4/2016 |
| JP | 5945965 B2 | 7/2016 |
| WO | 2012/132446 A1 | 10/2012 |

OTHER PUBLICATIONS

Aug. 18, 2020 Office Action issued for Japanese Patent Application No. 2016-247355.
Feb. 9, 2021 Office Action issued in Japanese Patent Application No. 2016-247355.

\* cited by examiner

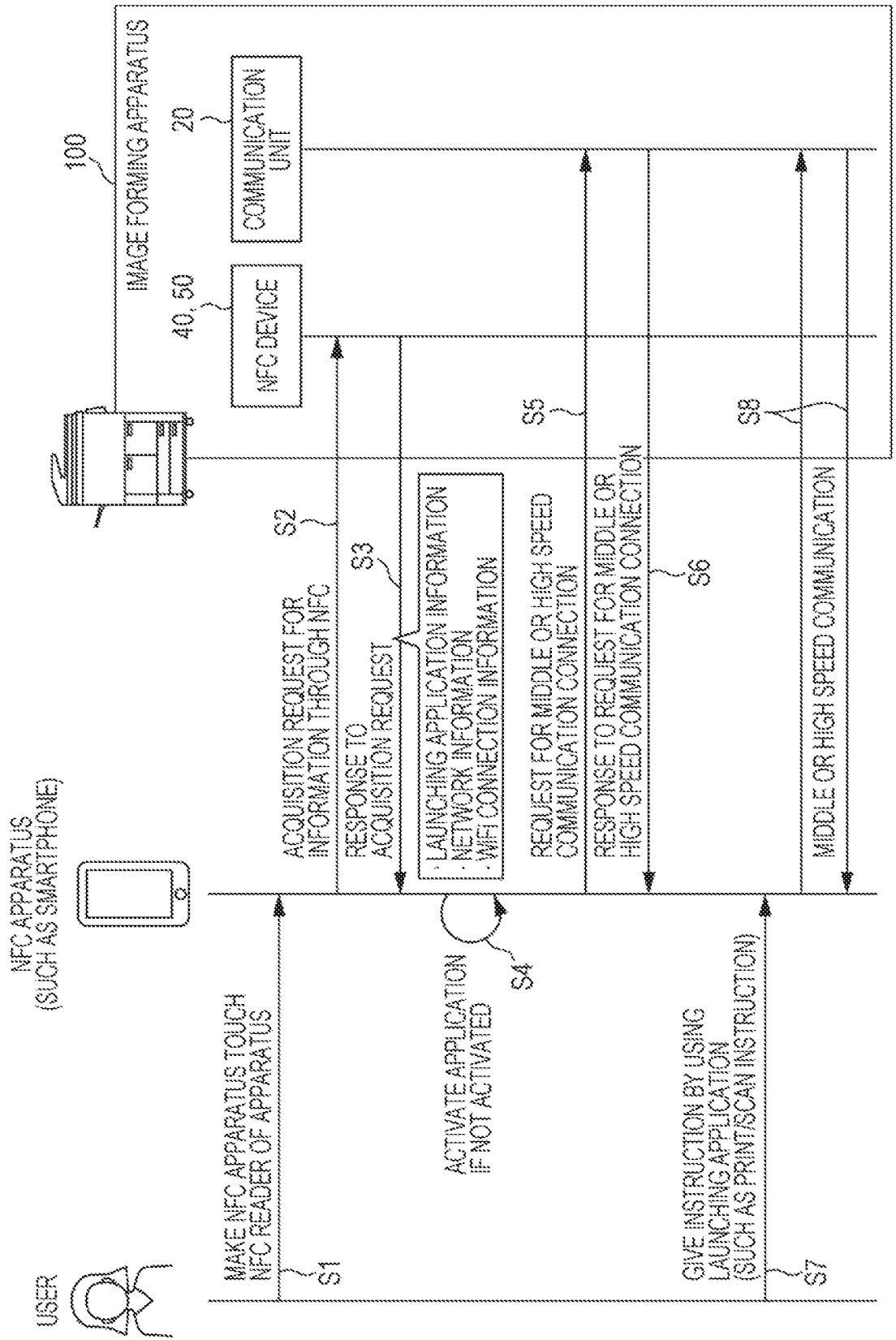

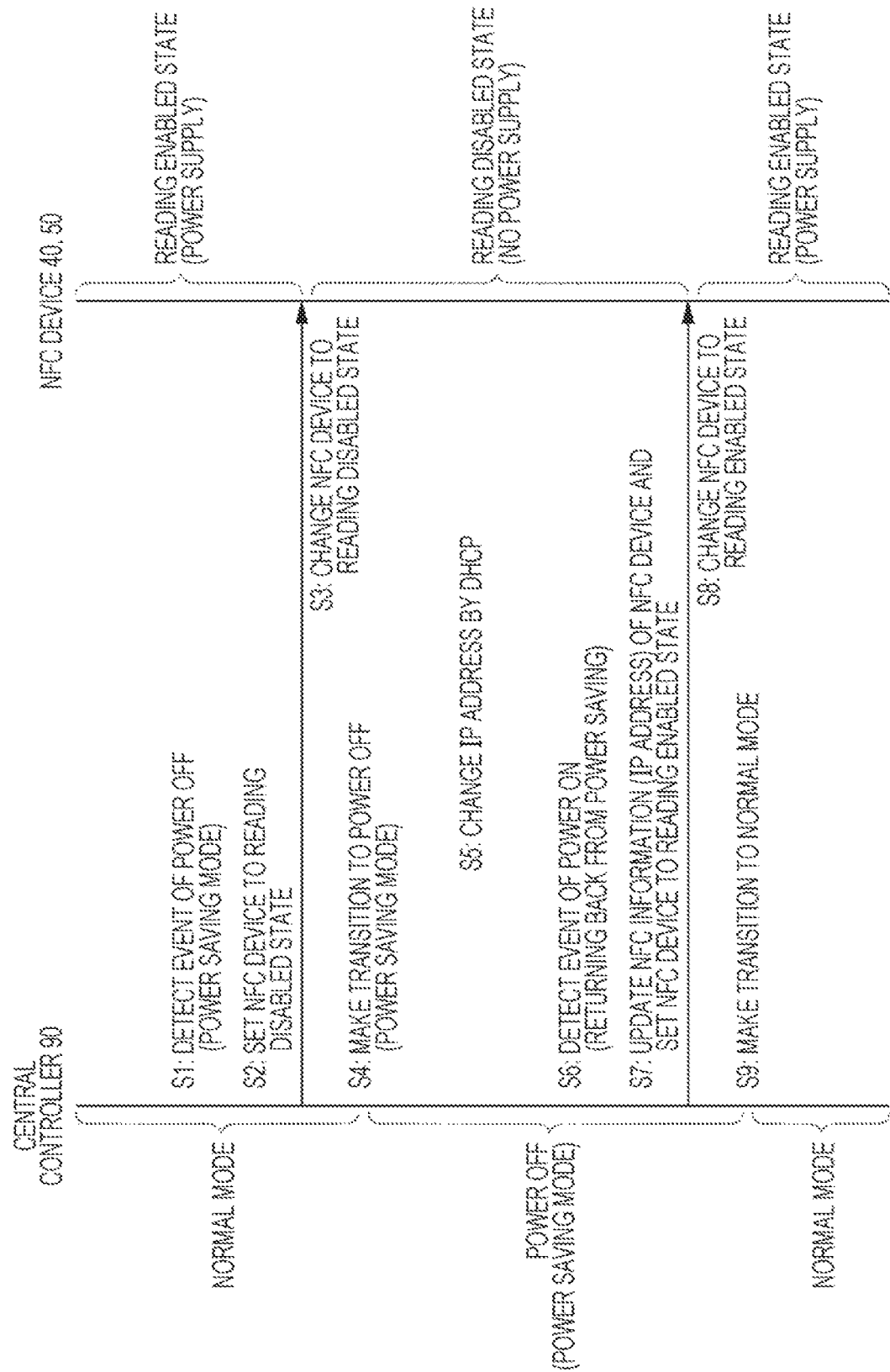

IMAGE FORMING APPARATUS AND NON-TRANSITORY COMPUTER READABLE MEDIUM

CROSS-REFERENCE TO RELATED APPLICATIONS

This is a Continuation of application Ser. No. 15/667,946 filed Aug. 3, 2017, which in turn is based on and claims priority under 35 USC 119 from Japanese Patent Application No. 2016-247355 filed Dec. 21, 2016. The disclosure of the prior applications is hereby incorporated by reference herein in its entirety.

BACKGROUND

(i) Technical Field

The present invention relates to an image forming apparatus and a non-transitory computer readable medium.

(ii) Related Art

Portable terminals, such as smartphones, tablet terminals, and personal computers (PCs), which are provided with functions defined by near field communication (NFC) standards that are exemplary proximity communication standards have become widely used. In addition, image forming apparatuses provided with devices supporting NFC standards in order to receive/transmit information from/to the portable terminals through NFC are also known.

For example, with widespread use of proximity communication such as NFC, it is expected that an improved technique for an image forming apparatus provided with a proximity communication device is introduced.

SUMMARY

According to an aspect of the invention, there is provided an image forming apparatus that controls at least one proximity communication device in such a manner that an external apparatus is not capable of reading information from the at least one proximity communication device during a period in which power supply to the at least one proximity communication device is stopped.

BRIEF DESCRIPTION OF THE DRAWINGS

Exemplary embodiment of the present invention will be described in detail based on the following figures, wherein:

FIG. 3 is a diagram illustrating exemplary NFC communication performed by the image forming apparatus; and FIG. 4 is a diagram illustrating exemplary control of NFC devices which is exerted by a central controller.

DETAILED DESCRIPTION

Figure 1:
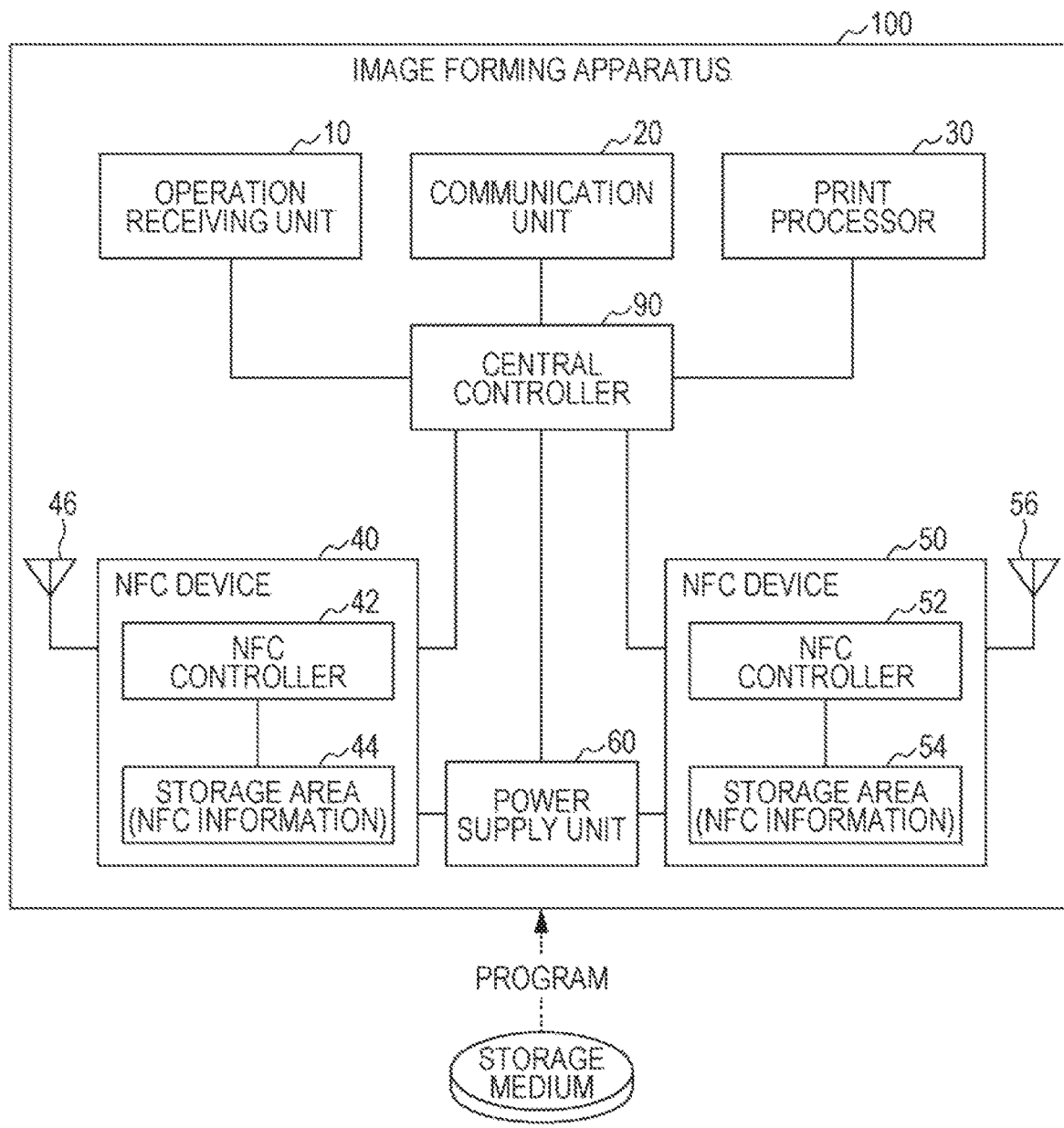
FIG. 1 is a diagram illustrating an exemplary image forming apparatus suitable for an exemplary embodiment of the present invention.

FIG. 1 is a diagram illustrating an exemplary image forming apparatus suitable for an exemplary embodiment of the present invention. An image forming apparatus 100 includes the units illustrated with reference numerals in FIG. 1, and implements a function of printing images (including an image containing only characters, numerals, and symbols) on print sheets.

An operation receiving unit 10 includes operation devices, such as a touch panel and switches, and receives operations from users using the image forming apparatus 100.

A communication unit 20 communicates with external apparatuses, such as smartphones, tablet terminals, and personal computers, that establish a communication connection with the image forming apparatus 100 through a communication line such as the Internet. In communication performed by the communication unit 20, a wired communication protocol may be used, or a wireless communication protocol, such as WiFi®, WiFi Direct®, or, Bluetooth®, may be used.

A print processor 30 performs printing according to print instruction information received by the operation receiving unit 10 or the communication unit 20. The print processor 30 prints image data indicated by the print instruction information, on print sheets. Print sheets are set, for example, on a paper feed tray.

The image forming apparatus 100 is provided with functions of proximity communication (encompassing near field wireless communication). Exemplary suitable proximity communication is near field communication (NFC). The image forming apparatus 100 includes multiple NFC devices 40 and 50 supporting an NFC standard(s).

Each of the NFC devices 40 and 50 communicates, in conformity with the NFC standard(s), with external apparatuses provided with NFC functions. An exemplary suitable NFC device 40 is an active NFC tag, and an exemplary suitable NFC device 50 is also an active NFC tag. An exemplary suitable external apparatus is a portable terminal, such as a smartphone, a tablet terminal, or a portable personal computer (PC).

The NFC device 40 includes an NFC controller 42, a storage area 44, and an antenna 46, and receives/transmits data from/to an external apparatus such as a portable terminal through wireless communication via the antenna 46. Data (NFC information) that is provided for an external apparatus (that may be read by the external apparatus) is stored in the storage area 44. The NFC controller 42 controls writing and reading of data in the storage area 44.

The NFC device 50 includes an NFC controller 52, a storage area 54, and an antenna 56, and receives/transmits data from/to an external apparatus such as a portable terminal through wireless communication via the antenna 56. Data (NFC information) that is provided for an external apparatus (that may be read by the external apparatus) is stored in the storage area 54. The NFC controller 52 controls writing and reading of data in the storage area 54.

The NFC device 40 is mounted, for example, in an integrated circuit (IC) card reader. The IC card reader or the like is connected to the apparatus body of the image forming apparatus 100, for example, by using Universal Serial Bus (USB), and is supplied with power from the apparatus body via USB. For example, during energization in which power is supplied from the apparatus body, data may be written and read in the storage area 44.

The NFC device 40 may be provided with functions as a passive tag in which, during non-energization in which no power is supplied from the apparatus body, data in the storage area 44 is provided for an external apparatus (may be read by the external apparatus) by using an induced current caused by radio waves obtained from the external apparatus. When the NFC device 40 functions as a passive tag, the NFC controller 42 is desirably capable of permitting or inhibiting reading of data in the storage area 44 which is performed by an external apparatus.

In contrast, for example, the NFC device 50 is provided for a user interface substrate (UI substrate) forming a touch panel or the like that is an exemplary suitable operation receiving unit 10. The NFC device 50 is supplied with power from the apparatus body via the UI substrate. For example, during energization in which power is supplied from the apparatus body, data may be written and read in the storage area 54.

The NFC device 50 is provided with functions as a passive tag in which, during non-energization in which no power is supplied from the apparatus body, data in the storage area 54 is provided for an external apparatus (may be read by the external apparatus) by using an induced current caused by radio waves obtained from the external apparatus. When the NFC device 50 functions as a passive tag, the NFC controller 52 is capable of permitting or inhibiting reading of data in the storage area 54 which is performed by an external apparatus.

A power supply unit 60 supplies power to each of the NFC devices 40 and 50. For example, when the NFC device 40 is mounted in an IC card reader or the like, power is supplied from the power supply unit 60 through USB to the IC card reader and the NFC device 40. For example, when the NFC device 50 is provided for the UI substrate, power is supplied from the power supply unit 60 through the UI substrate to the NFC device 50.

A central controller 90 has overall control over the image forming apparatus 100. In the overall control exerted by the central controller 90, an instruction received from a user through the operation receiving unit 10 or the communication unit 20 is also reflected.

Examples suitable for the image forming apparatus 100 illustrated in FIG. 1 include a printer, a copier, and a facsimile (FAX). Further, a multi-function peripheral provided with multiple functions among a printer function, a copier function, and a facsimile function is also an exemplary suitable image forming apparatus 100.

The image forming apparatus 100 in FIG. 1 may be implemented, for example, by using a computer or the like. The computer or the like includes hardware resources, for example, a computing device such as a central processing unit (CPU), storage devices, such as a memory and a hard disk, a communication device that uses a communication line such as the Internet, a device that reads data from a storage medium, such as an optical disk or a semiconductor memory, and that writes data, a display device such as a display, and an operation device that receives operations from users.

For example, programs (software) corresponding to at least some functions (particularly, functions of the central controller 90) among the functions of the units designated with reference numerals in FIG. 1 are read into the computer. Through collaboration between the hardware resources included in the computer and the software that has been read, at least some of the functions provided for the image forming apparatus 100 are implemented by using the computer. The programs may be provided for the computer (the image forming apparatus 100), for example, via a communication line such as the internet, or may be provided for the computer (the image forming apparatus 100) by storing the programs in a storage medium such as an optical disk.

The overall configuration of the image forming apparatus 100 illustrated in FIG. 1 is described above. Functions or the like implemented by the image forming apparatus 100 in FIG. 1 will be described in detail. For the configuration (part) illustrated in FIG. 1, reference numerals in FIG. 1 will be used in the description made below.

Figure 2:
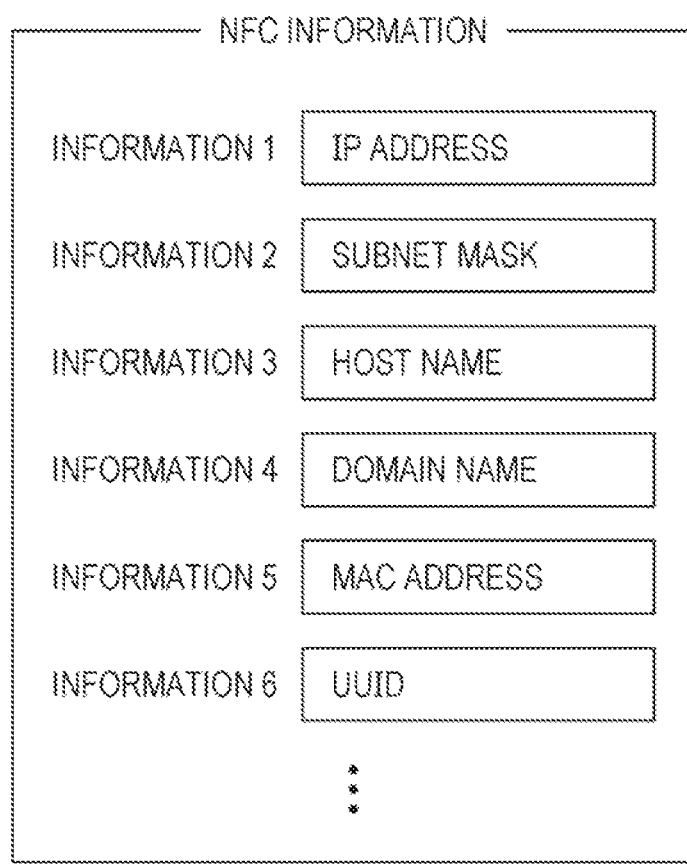
FIG. 2 is a diagram illustrating exemplary near field communication (NFC) information.

FIG. 2 is a diagram illustrating exemplary NFC information. FIG. 2 illustrates exemplary NFC information that is data stored in the storage areas 44 and 54 included in the NFC devices 40 and 50 in FIG. 1.

In the example illustrated in FIG. 2, NFC information includes pieces of information of information 1, information 2, information 3, etc. The NFC devices 40 and 50 are relatively inexpensive. For example, compared with a storage device with large storage capacity, such as a hard disk drive (HDD), the storage capacity of the storage areas 44 and 54 is very small. Therefore, it is not possible to store a large amount of NFC information in the storage areas 44 and 54.

FIG. 3 is a diagram illustrating exemplary NFC communication performed by the image forming apparatus 100. FIG. 3 illustrates a sequence followed when a user uses the image forming apparatus 100 through an NFC apparatus such as a smartphone provided with NFC functions.

A user touches an NFC reader of the image forming apparatus 100 with an NFC apparatus that is carried with the user (S1). That is, the NFC apparatus is held over the antenna 46 of the NFC device 40 or the antenna 56 of the NFC device 50 that functions as an NFC reader, enabling NFC communication between the NFC apparatus and the image forming apparatus 100 to be performed.

In this state, the NFC apparatus operates, for example, in the reader/writer mode, and data is received/transmitted from/to an active NFC tag included in the image forming apparatus 100, that is, the NFC device 40 or the NFC device 50.

For example, an acquisition request to acquire information through NFC communication is transmitted from the NFC apparatus to the image forming apparatus 100 (S2). The NFC apparatus reads information according to the acquisition request, that is, information stored in the storage area 44 of the NFC device 40 or the storage area 54 of the NFC device 50 (S3). Thus, for example, the NFC apparatus obtains launching application information, network information, middle or high speed communication connection information, and the like stored in the storage area 44 or the storage area 54. When the launching application has not been activated, the NFC apparatus activates the launching application corresponding to the launching application information (S4).

A connection request for middle or high speed communication is transmitted from the NFC apparatus to the image forming apparatus 100 (S5). If a connection may be established, a connection response for middle or high speed communication is transmitted from the image forming apparatus 100 to the NFC apparatus (S6). This enables middle or high speed communication having longer communication distance and higher communication speed compared with NFC communication to be performed between the communication unit 20 of the image forming apparatus 100 and the NFC apparatus. Exemplary suitable middle or high speed communication is WiFi®. Alternatively, wireless communication such as Bluetooth® may be used as middle or high speed communication.

When middle or high speed communication is enabled, the user gives an instruction to perform printing, scanning, or the like by using the launching application information contained in the NFC apparatus (S7), and data is transferred between the NFC apparatus and the image forming apparatus 100 through middle or high speed communication according to a user instruction (S8). Thus, the image forming apparatus 100 performs image forming processing, such as printing or scanning, according to a user instruction.

As described by using FIG. 1, the image forming apparatus 100 is provided with multiple proximity communication devices (the NFC devices 40 and 50). During a period in which power supply to the proximity communication devices is stopped, the image forming apparatus 100 controls the proximity communication devices so that an NFC apparatus (external apparatus) such as a smartphone fails to read information from the proximity communication devices. For example, the central controller 90 controls the NFC devices 40 and 50.

FIG. 4 is a diagram illustrating exemplary control of the NFC devices 40 and 50 which is exerted by the central controller 90. FIG. 4 illustrates an exemplary case in which the image forming apparatus 100 makes a transition from the normal mode to the power-off state and in which the image forming apparatus 100 makes a transition (returns back) from the power-off state to the normal mode. In the normal mode, printing or the like may be performed.

In the normal mode of the image forming apparatus 100, when the central controller 90 detects an event of turning off power supply (S1), the central controller 90 controls the NFC devices 40 and 50 so that the NFC devices 40 and 50 are set to a reading disabled state (S2).

Thus, the NFC controllers 42 and 52 of the NFC devices 40 and 50 inhibit an external apparatus from reading data in the storage areas 44 and 54, and the states of the NFC devices 40 and 50 are changed to the reading disabled state (S3). In addition, power supply from the power supply unit 60 to the NFC devices 40 and 50 is stopped. That is, the functions as a passive tag of the NFC devices 40 and 50 are inhibited. Then, the image forming apparatus 100 makes a transition to the power-off state (S4).

In the example illustrated in FIG. 4, in the power-off state of the image forming apparatus 100, the Internet Protocol address (IP address) of the image forming apparatus 100 is changed (S5). For example, a dynamic host configuration protocol (DHCP) server changes the IP address assigned to the image forming apparatus 100.

In the power-off state of the image forming apparatus 100, when the central controller 90 detects an event of turning on power supply (S6), the central controller 90 updates the NFC information, and then controls the NFC devices 40 and 50 so that the NFC devices 40 and 50 are set to a reading enabled state (S7).

Thus, the NFC controllers 42 and 52 of the NFC devices 40 and 50 update the NFC information in the storage areas 44 and 54, and, for example, the new IP address obtained through the change operation in S5 is stored in the storage areas 44 and 54 as the NFC information. Further, the NFC controllers 42 and 52 of the NFC devices 40 and 50 permit reading of data in the storage areas 44 and 54, and the states of the NFC devices 40 and 50 are changed to the reading enabled state (S8). Then, power supply from the power supply unit 60 to the NFC devices 40 and 50 is started. The image forming apparatus 100 then makes a transition to the normal mode (S9).

In the case where the image forming apparatus 100 makes a transition from the normal mode to the power saving mode, and where the image forming apparatus 100 then makes a transition (returns back) from the power saving mode to the normal mode, the example in FIG. 4 is also applied. That is, in the normal mode of the image forming apparatus 100, when the central controller 90 detects an event of making a transition to the power saving mode (S1), the central controller 90 controls the NFC devices 40 and 50 so that the NFC devices 40 and 50 are set to the reading disabled state (S2).

Thus, the states of the NFC devices 40 and 50 are changed to the reading disabled state (S3), and power supply from the power supply unit 60 to the NFC devices 40 and 50 is also stopped. Then, the image forming apparatus 100 makes a transition to the power saving mode (S4). In addition, in the power saving mode, the IP address of the image forming apparatus 100 is changed (S5).

In the power saving mode of the image forming apparatus 100, when the central controller 90 detects an event of returning back from the power saving mode (S6), the central controller 90 updates the NFC information, and then controls the NFC devices 40 and 50 so that the NFC devices 40 and 50 are set to the reading enabled state (S7).

Thus, for example, the new IP address obtained through the change operation in S5 is stored in the storage areas 44 and 54 of the NFC devices 40 and 50, and the states of the NFC devices 40 and 50 are changed to the reading enabled state (S8). Then, power supply from the power supply unit 60 to the NFC devices 40 and 50 is started. The image forming apparatus 100 then makes a transition to the normal mode (S9).

According to the example in FIG. 4, in the power-off state or the power saving mode of the image forming apparatus 100, power supply to the NFC devices 40 and 50 is stopped. During a period in which power supply is stopped, the IP address before change is not provided to an NFC apparatus (external apparatus) such as a smartphone.

For example, at a time point (S3) at which the states of the NFC devices 40 and 50 are changed to the reading disabled state, the IP address before change is stored as the NFC information. After that, even if the IP address is changed (S5), during a period in which power supply from the power supply unit 60 to the NFC devices 40 and 50 is stopped, the IP address before change is not read by an NFC apparatus.

Further, for example, at a time point (S8) at which the states of the NFC devices 40 and 50 are changed to the reading enabled state, the IP address after change is stored in the storage areas 44 and 54 as the NFC information (S7). Therefore, the IP address after change may be provided to an NFC apparatus through NFC communication.

The desirable exemplary embodiment of the present invention is described above. The above-described exemplary embodiment is merely exemplary in all points, and does not limit the scope of the present invention. The present invention encompasses various exemplary embodiments obtained through modification without departing from the nature of the present invention.

What is claimed is:

1. An information processing apparatus, comprising:
a processor configured to;
detect an event; and
control at least one proximity communication device in such a manner that an external apparatus is not capable of reading information from the at least one proximity communication device when the event is detected.

2. The information processing apparatus according to claim 1,
wherein the processor is configured to;
control the at least one proximity communication device is switched between a reading enabled mode and a reading disabled mode, the reading enabled mode being a mode in which an external apparatus is capable of reading information in a storage area of the at least one proximity communication device, the reading disabled mode being a mode in which an external apparatus is not capable of reading the information, and control the at least one proximity communication device to the reading disabled mode during the power stopping period of the at least one proximity communication device.

3. The information processing apparatus according to claim 1, wherein the processor is further configured to:

control the at least one proximity communication device is switched between a reading enabled mode and a reading disabled mode, the reading enabled mode being a mode in which an external apparatus is capable of reading information in a storage area of the at least one proximity communication device, the reading disabled mode being a mode in which an external apparatus is not capable of reading the information; and control the at least one proximity communication device to the reading disabled mode during a power stopping period of the at least one proximity communication device in such a manner that the external apparatus is not capable of reading information from the at least one proximity communication device when the event is detected.

4. The information processing apparatus according to claim 1, wherein the detecting an event comprises detecting an event of turning on power saving mode or powering off the information processing apparatus, and wherein the controlling the at least one proximity communication device in such a manner that the external apparatus is not capable of reading information from the at least one proximity communication device occurs when (1) the event of the power saving mode is turned on or (2) powering off the information processing apparatus.

5. The information processing apparatus according to claim 1, wherein the detecting an event comprises detecting an event a power stopping period of at least one proximity communication device, and wherein the controlling the at least one proximity communication device in such a manner that the external apparatus is not capable of reading information from the at least one proximity communication device occurs when the event of the power stopping period of at least one proximity communication device.

* * * * *